United States Patent [19]

Krishnakumar et al.

[11] Patent Number: 4,950,143
[45] Date of Patent: Aug. 21, 1990

[54] INJECTION MOLD MANIFOLD ARRANGEMENT

[75] Inventors: Suppayan M. Krishnakumar, Nashua; Wayne N. Collette; Steven L. Schmidt, both of Merrimack; Thomas E. Nahill, Amherest, all of N.H.

[73] Assignee: Continental PET Technologies, Inc., Norwalk, Conn.

[21] Appl. No.: 292,956

[22] Filed: Jan. 3, 1989

[51] Int. Cl.$^5$ .............................................. B29C 45/02
[52] U.S. Cl. .................................. 425/130; 264/297.2; 264/328.4; 264/328.8; 264/328.13; 425/544; 425/557; 425/559; 425/562; 425/573
[58] Field of Search ............. 264/828.4, 328.8, 328.13, 264/328.14, 328.15, 297.2; 425/130, 133.1, 544, 549, 522, 557, 523, 559, 560, 562, 564, 573

[56] References Cited

U.S. PATENT DOCUMENTS 4,717,324  1/1988  Schad et al. ........................ 425/130

Primary Examiner—Jay H. Woo
Assistant Examiner—Timothy W. Heitbrink
Attorney, Agent, or Firm—Charles E. Brown; Paul Shapiro; Charles A. Brown

[57] ABSTRACT

It has been found that when layered preforms are being injection molded utilizing at least two materials, it is possible to maintain the same horizontal and vertical pitch of adjacent cavities as is possible when each mold cavity is being filled with a single material. Most particularly, it has been found that when the percentage of the material to be injected into a mold cavity is relatively high, it is possible to utilize a single metering pot for four adjacent mold cavities. On the other hand, if one of the materials to be injected into a mold cavity constitutes a relatively low percentage of the volume of a mold cavity, it has been found that a small metering pot must be provided for each of the cavities of the four cavity mold. Most particularly, with this combination, it is possible to maintain the pitch of the single material mold and thereby maintain the small size of existing injection systems as opposed to an increase in the pitch of the mold cavities which would increase the size of the mold structure.

7 Claims, 2 Drawing Sheets

INJECTION MOLD MANIFOLD ARRANGEMENT

This invention relates in general to new and useful improvements in the injection manifold of an injection molding system for forming injection molded preforms which are to be blow molded into containers, and more particularly to an injection mold manifold apparatus for forming a preform which is of a multi-material construction.

In the past, preforms have been formed of a single material by way of a single injection of material to fill the mold cavity. In such an injection molding system, the injection manifold arrangement is quite simple with there being a single supply of the flowable molten plastic material to the numerous cavities with there being as many as 72 cavities in a mold system. However, when more than one material is to be utilized in forming the preform, the injection mold manifold arrangement becomes quite complex and includes among other supply arrangements metering pots. Since each mold cavity is not being filled with a single material, but with percentages of different materials, the injection manifold arrangement is not one wherein one shot filling occurs. Thus in the recent past, it has been found necessary to provide an injection arrangement separate and apart for each mold cavity. The net result is that the injection manifold is much larger than the injection manifold utilizing and injecting a single material and this has resulted in an increase in the pitch or spacing of adjacent mold cavities. The net result is that the overall mold construction is much larger than before and also much more costly.

In accordance with this invention, there is provided an injection mold manifold arrangement wherein the pitch or spacing between adjacent mold cavities may remain essentially the same as before when a single material is being injected into the mold cavities.

With the above and other objects in view that will hereinafter appear, the nature of the invention will be more clearly understood by reference to the following detailed description, the appended claims, and the several views illustrated in the accompanying drawings.

BRIEF DESCRIPTION OF THE DRAWINGS

Referring now to FIG. 1 in particular, it will be seen that there illustrated a typical four cavity mold which is generally identified by the numeral 10. The cavities within the mold 10 are spaced both vertically and horizontally with only the nozzle receiving openings 12 of each cavity being illustrated. It is to be understood that the cavities are elongated horizontally.

Figure 1:
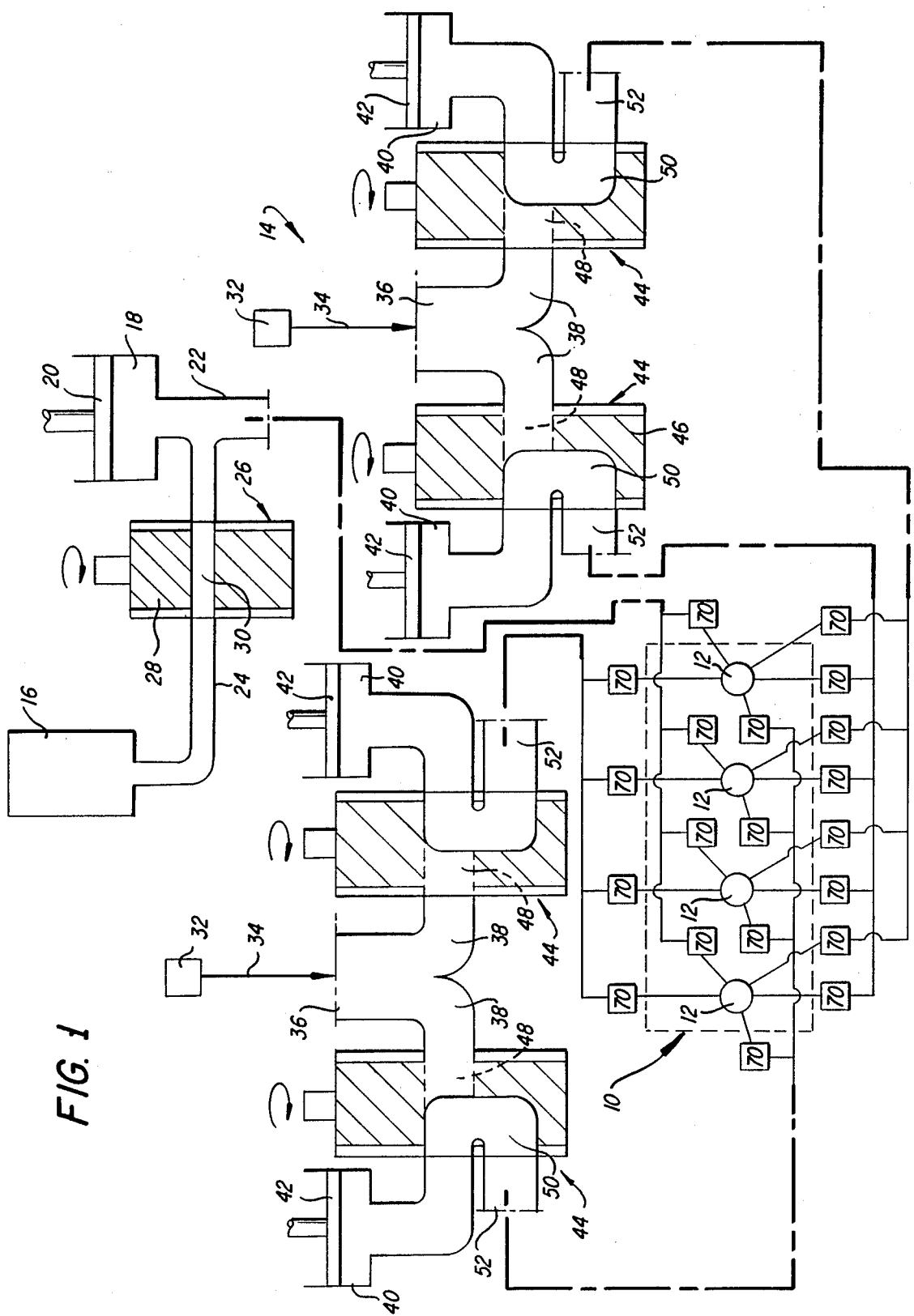
FIG. 1 is a schematic view of an injection manifold arrangement for supplying plural materials to each cavity.

In order that the invention may be understood, when a single material is to be injected into each cavity to form a preform, with a 28 mm neck finish, the centers of the cavities have a horizontal pitch of 150 and a vertical pitch of 60. However, when one pot is required per cavity for each different material utilized, the horizontal pitch must be increased to 185 and the vertical pitch to 75.

Also, with a single material forming the preform and the mold cavity being configured to have a 80 mm neck finish, the horizontal pitch is 200 and the vertical pitch is 125 while with the multiple materials, the horizontal pitch is 300 and the vertical pitch is 140.

It will be readily apparent that when the size of the mold is increased, the cost of the injection molding apparatus is also increased.

In order to reduce the tooling size (and cost) for multi-layer systems, in accordance with this invention, when the quantity to be injected into each mold cavity is relatively great, it is proposed to utilize one metering pot for that material to supply as many as four mold cavities. On the other hand, when the percentage of material to be directed into a mold cavity is relatively low, it still may be necessary to provide a single metering pot for each mold cavity. However, these metering pots could be small in size and not occupy sufficient space to require an increase in the pitch of the mold cavities.

Referring once again to FIG. 1, it will be seen that there is associated with the four cavity mold 10 an injection manifold arrangement which is generally identified by the numeral 14 and which is only schematically illustrated. With the arrangement of FIG. 1, a mold cavity may be partially filled with a primary resin, then a small quantity of a secondary resin may be injected into the mold cavity followed by the complete filling of the mold cavity with the same primary resin. In order to accomplish this, there is provided the usual extruder 16 for the primary resin, which extruder will be considered to be a primary resin supply source. There is also a metering pot 18 of a size to inject a first quantity of the primary resin into all of the mold cavities. The metering pot 18 includes a piston 20 which is selectively positioned so as to deliver a premeasured quantity of the primary resin into a supply passage 22. The supply passage 22 is coupled to each of the mold cavities. The supply passage 22 is coupled to the primary resin supply 16 by means of a passage 24 in which there is positioned a spool valve 26 having a rotatable spool 28 with a flow passage 30 therethrough.

There is also provided a supply 32 for a secondary resin which may be in the form of an extruder or other type of supply means. This supply 32 has a supply passage 34 which is coupled to spaced supply passages 36 which are further connected to supply passages 38 leading to individual small measuring pots 40 each of which is provided with a dispensing piston 42. Each supply passage 38 has incorporated therein a spool valve generally identified by the numeral 44 including a rotatable spool 46. The spool 46 has a through passage 48 which couples the second material supply 32 to a respective pot 40 in one position of the spool 46. In another position of the spool 46, a control passage 50 therein connects the metering pot 40 to a delivery passage 52. Each delivery passage 52 is coupled to a respective one of the mold cavities.

Figure 2:
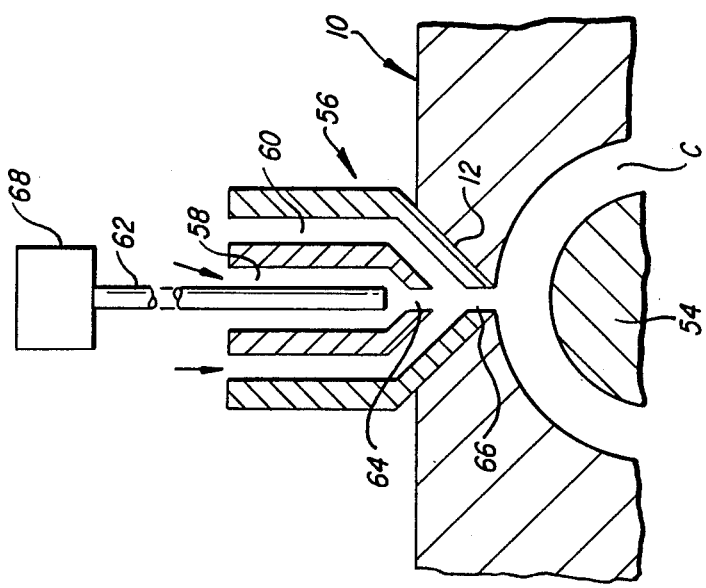
FIG. 2 is a schematic sectional view taken through the bottom end of a mold cavity and schematically shows a nozzle for directing different materials into the cavity.

In order that the operation of the injection arrangement may be understood, reference is made to FIG. 2 wherein a single cavity C of the mold 10 has the base portion only thereof illustrated. The cavity C has a core 54 positioned therein so as to form a closed end tubular preform. In one of the respective cavity openings 12 of the mold 10, a resin supply nozzle, generally identified by the numeral 56, is illustrated seated therein in sealed relation thereto. The illustrated nozzle 56 is provided with a passage 58 for a first material and a concentric passage 60 for a second material. Flow through the passage 58 is controlled by the position of an axially movable gate 62 with a first gate surface 64 while flow of the second material through the passage 60 is controlled by the same gate pin 62 in conjunction with a gate 66. The gate pin 62 is positioned by a conventional control device 68.

OPERATION

With the metering pots 18 and 40 filled with respective resins, the gate pin 62 is retracted to open both the gate 66 and the gate 64. The piston 20 of the metering pot 18 is then actuated so as to deliver to each of the four mold cavities a similar quantity of the first material. Then the gate pin 62 is moved so as to close off the gate 64 while permitting the gate 66 to remain open. At that time the valves 44 are set so as to deliver the second material from the metering pots 40 into the respective mold cavities C. Thereafter with the valve 26 in its supply position of FIG. 1 and with the gate pin 62 retracted, an additional quantity of the first material is injected into each mold cavity C to completely fill that mold cavity.

Once the injection of the required material into the mold cavity C is completed, the gate pin 62 is moved to a position to close the two gates 64, 66. When this occurs, with the valve 26 in the position shown in FIG. 1, the metering pot 18 is refilled. Further, when the valves 44 are positioned to communicate the supply 32 with the metering pots 40, the metering pots 40 are refilled.

Although a four cavity mold has been specifically illustrated in conjunction with the injection mold arrangement 14, it is to be understood that the same injection manifold arrangement may be utilized in conjunction with a two cavity mold except that there would be only two of the metering pots 40 instead of four.

With the injection manifold arrangement 14 of FIG. 1, it is possible to utilize the same mold cavity pitch as that which has been utilized in conjunction with a single material preform.

It is to be understood that competitive multi-layer systems do not utilize individual cavity metering pots, but rely upon temperature, pressure and flow rate balance from the extruder to control the material supplied each cavity. Cavity to cavity volume variations with these systems is excessive and for a single fill of 50%, the variation in each cavity of a 16 cavity mold is ±20–50%, while the variation in a 16 cavity mold utilizing metering pots is ±2%.

With a two cavity mold in accordance with this invention, the variation is ±3–5% whereas with a four cavity mold the variation is ±4–6%.

It has been found that the cavity to cavity volume variation increase for shared cavities versus dedicated metering pots will be acceptable if the volume of material injected forms at least 20–30% of the total preform weight. For very low volume percentages (i.e. 2–5%) it is necessary to utilize dedicated pots wherein the relative percentages of the first material as opposed to the second material is 96/4.

In accordance with this invention, a typical preform may be made by first injecting 50% of the volume of the cavity from the metering pot 18 followed by injecting into each cavity the second material having a volume on the order 4% of the mold cavity volume. These two measured injections are followed by the filling of the individual cavity by 40% of the cavity volume of the first material directly from the extruder.

In a typical formation of a layered preform, the primary material will be a polyester resin such as PET and the second material will preferably a suitable barrier material such as EVAL.

At this time it must be appreciated that for shot to shot consistency and especially for cavity to cavity consistency there should be a balancing device, both mechanically and thermal incorporated in each of the passages between the shooting pots 18 and 40 and each nozzle 56. Each balancing device 70 may include suitable variable heater means and adjustable valve means not specifically illustrated.

Figure 3:
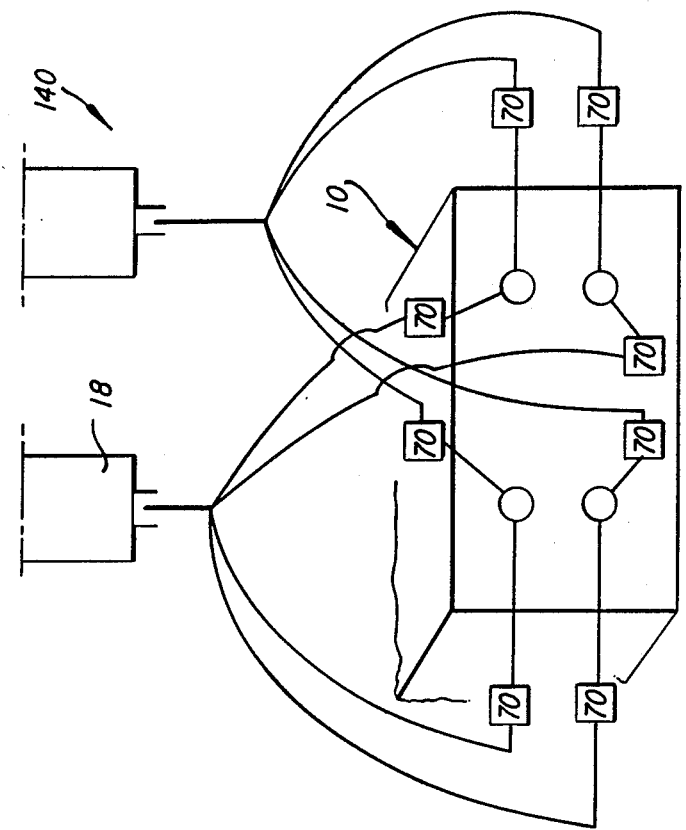
FIG. 3 is a schematic view showing a modified manifold arrangement in conjunction with a four cavity mold.

Referring now to FIG. 3, there is illustrated an arrangement wherein the percentage of material to be injected into a mold cavity in each delivery step will be relatively high. Under the circumstances, in lieu of the individual metering pots 40, there can be single, much larger metering pot 140 which will deliver simultaneously the second material to each of the four mold cavities. This metering pot will be utilized in conjunction with the metering pot 18 which also simultaneously delivers a metered amount of the first material to each mold cavity. Of course, the individual mold cavities may be finally filled with the first material in the manner previously described.

Balancing devices 70 may also be utilized in the embodiment of FIG. 3.

Although only a preferred embodiment of the invention has been specifically illustrated and described herein, it is to be understood that minor variations may be made in the injection manifold arrangement without departing from the spirit and scope of the invention as defined by the appended claims.

We claim:

1. Apparatus for use in combination with a plural cavity injection mold for multiple layer preforms of a selected size, there being a known cavity spacing in a multiple cavity injection system for a preform of said selected size when said preform is formed of a single material, said apparatus comprising a resin supply apparatus of a size for maintaining cavity spacing in said plural material injection mold essentially the same as that which exists in said multiple cavity injection system for a single material preform of said selected size, said resin supply apparatus includes first and second supply units, and at least one of said resin supply units including a single supply valve device coupled to all of said cavities for simultaneously supplying a quantity of resin to all of said cavities from a single resin source.

2. The apparatus of claim 1 wherein another of said resin supply units include a separate supply device for each of said cavities for supplying a quantity of a second resin to each of said cavities.

3. The apparatus of claim 2 wherein the quantity of said second resin supplied to each of said cavities is a small percentage of the total resin supplied each cavity.

4. Apparatus according to claim 3 wherein said small percentage is on the order of 2-5% by volume.

5. Apparatus according to claim 2 wherein said second resin is supplied to each of said separate supply devices from a single resin source.

6. Apparatus for use in combination with a plural cavity injection mold for multiple layer preforms of a selected size, there being a known cavity spacing in a multiple cavity injection system for a preform of said selected size when said preform is formed of a single material, said apparatus comprising a resin supply apparatus of a size for maintaining cavity spacing in said plural material injection mold essentially the same as that which exists in said multiple cavity injection system for a single material preform of said selected size, said resin supply apparatus includes first and second supply units, and at least one of said resin supply units including a single supply device coupled to all of said cavities for all of said cavities from a single resin source, said at least one of said resin supply units including a fluid heated resin source and a single dispensing pot, and means including valve means for selectively connecting said fluid heated resin source and said single dispensing pot to all of said cavities.

7. Apparatus according to claim 6 wherein said valve means also selectively connects said resin source to said single dispensing pot.

* * * * *